(12) United States Patent
Watanabe et al.

(10) Patent No.: US 6,898,476 B2
(45) Date of Patent: May 24, 2005

(54) MANAGEMENT OF WORKING STATUS WITH LARGE-SCALED DISPLAY

(75) Inventors: Kazuyoshi Watanabe, Nagano-ken (JP); Takashi Oguchi, Nagano-ken (JP); Mitsuaki Maruyama, Nagano-ken (JP); Mamoru Shimizu, Nagano-ken (JP); Taketoshi Ichikawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 214 days.

(21) Appl. No.: 09/855,664

(22) Filed: May 16, 2001

(65) Prior Publication Data

US 2002/0010519 A1 Jan. 24, 2002

(30) Foreign Application Priority Data

May 31, 2000 (JP) ........................................ 2000-162239

(51) Int. Cl.⁷ ............................. G06F 19/00; G09G 5/08
(52) U.S. Cl. ......................... 700/108; 700/99; 700/106; 700/111; 345/158
(58) Field of Search ............................. 700/83, 93–104, 700/108, 111; 705/7–9

(56) References Cited

U.S. PATENT DOCUMENTS

| | | | | |
|---|---|---|---|---|
| 5,216,612 A | * | 6/1993 | Cornett et al. | 700/96 |
| 5,835,078 A | * | 11/1998 | Arita et al. | 345/158 |
| 6,343,238 B1 | * | 1/2002 | Kudo | 700/108 |
| 2001/0023376 A1 | * | 9/2001 | Uchida et al. | 700/101 |
| 2001/0034775 A1 | * | 10/2001 | Minowa | 709/218 |

FOREIGN PATENT DOCUMENTS

| | | |
|---|---|---|
| JP | 61-77969 | 5/1986 |
| JP | 61-178160 | 8/1986 |
| JP | 05-174029 | 7/1993 |
| JP | 05-225207 | 9/1993 |
| JP | 06-314284 | 11/1994 |
| JP | 11-320345 | 11/1999 |

* cited by examiner

Primary Examiner—Leo Picard
Assistant Examiner—Douglas S. Lee
(74) Attorney, Agent, or Firm—Oblon, Spivak, McClelland, Maier & Neustadt, P.C.

(57) ABSTRACT

The object of the present invention is to ensure information sharing in a factory and enhance the production efficiency.

The management system of the present invention utilizes a liquid crystal projector PRJ to project an image of management information on a large-scaled display in the factory. A screen SCR is located at a specific position that allows each worker to simultaneously recognize the display and the object of the display (for example, in the case of a storehouse, the storage status of products). The contents of the display are varied according to the location of the display: for example, (1) instructions and actual conditions of storage of products in the storehouse; and (2) requirement of parts from assembly lines to a parts warehouse and status of delivery of parts from the parts warehouse. In a staff room of managers, information with regard to a first process, which is upstream most in the work flow in the factory (status of carrying-in work of parts and materials from outside) and information with regard to a last process, which is downstream most in the work flow (status of shipment) are displayed simultaneously. Such display enables workers in various sections and managers to accurately grasp the working status in the factory in real time, thus attaining the smooth operations and enhancing the production efficiency.

22 Claims, 15 Drawing Sheets

Fig.2

| Lane | Product Code | Shipment Plan | Quantity of Shipment | Quantity of Current Storage | Truck No. | Arrival Plan | Arrival Time | Number of Pallets | Number of Completed | Shipping Status |
|---|---|---|---|---|---|---|---|---|---|---|
| 2 | AAA | 10:00 | 966 | 966 | CN1 | 9:00 | 9:30 | 20 | 18 | Under Loading |
| 6 | BBB | 12:00 | 1152 | 1000 | CN2 | 11:00 | | 26 | 0 | Under Production |
| 1 | CCC | 14:00 | 966 | 560 | CN3 | 13:00 | | 20 | 0 | Under Production |
| 3 | AAA | 10:00 | 2880 | 2880 | CN4 | 9:00 | 9:00 | 60 | 60 | Shipped |
| 8 | BBB | 9:00 | 1152 | 1152 | CN1 | 8:00 | 8:00 | 26 | 26 | Shipped |
| .. | .. | .. | .. | .. | .. | .. | .. | .. | .. | .. |

Fig.8

Parts Requirement Information

| Line No. | Model Name | Part No. | Part Name | Date | Time | Quantity |
|---|---|---|---|---|---|---|
| L1 | PRT1 | PTS1 | *** | *** | 10:00 | 20 |
| L3 | PRT1 | PTS3 | *** | *** | 9:00 | 10 |
| L5 | PRT2 | PTS5 | *** | *** | 8:00 | 5 |
| : | : | : | : | : | : | : |
|  |  |  |  |  |  |  |

Delivery Status Information

| Part No. | Part | Quantity | Destination | Date | Time |
|---|---|---|---|---|---|
| PTS1 | *** | 20 | L3 | *** | 10:00 |
| PTS3 | *** | 10 | L1 | *** | 9:00 |
| : | : | : | : | : | : |
|  |  |  |  |  |  |

Fig.10

Shortage of Parts

| Model Name | Part No. | Part Name | Supplier | Requirement Source | Date of Requirement | Time of Requirement | Status | Delivery Schedule |
|---|---|---|---|---|---|---|---|---|
| PRT1 | AAA | * | * | * | ** | :** | Ordered | — |
| PRT2 | BBB | * | * | * | ** | : | Wait for Delivery | :** |
| .. | .. | .. | .. | .. | .. | .. | .. | .. |

Fig.12

Shipment Status

| Gate | Model Name | Quantity | Desination | Preparation | Packing | Documentation | Formalities for Shipment | Shipment |
|---|---|---|---|---|---|---|---|---|
| 1 | PRT1 | ** | *** | | | | | |
| 4 | PRT3 | ** | *** | | | | | |
| 2 | PRT2 | ** | *** | | | | | |
| 3 | PRT1 | ** | *** | | | | | |
| 6 | PRT1 | ** | *** | | | | | |
| | | | | | | | | |

Fig.14

Order of Parts

| Model Name | Part No. | Part name | Supplier | Date of Requirement | Time of Requirement | Delivery Schedule |
|---|---|---|---|---|---|---|
| PRT1 | AAA | * | * | **** | :** | — |
| PRT2 | BBB | * | * | **** | : | :** |
| : | : | : | : | : | : | : |

Delivery Status

| Model Name | Part No. | Part Name | Supplier | Delivery Schadule | Date of Delivery | Time of Delivery |
|---|---|---|---|---|---|---|
| PRT1 | AAA | * | * | : | **** | :** |
| PRT2 | BBB | * | * | : | **** | :** |
| : | : | : | : | : | : | : |

MANAGEMENT OF WORKING STATUS WITH LARGE-SCALED DISPLAY

BACKGROUND OF THE INVENTION

1. Field of the Invention

The present invention relates to a management technique that manages working status in a factory and in a warehouse by utilizing a large-scaled display.

2. Description of the Related Art

In a factory or a warehouse, a large number of workers are generally scattered in a wide area for work. Accurate mutual transmission of information is essential to enhance the working efficiency under such conditions, the information including a work plan, actual working conditions, working instructions. It is desirable that the transmitted information has sufficient consistency, that the information is updated with a variation in working status without delay, and that a large number of workers share the information. One of the methods that satisfy these conditions is real-time display of the information using a large-scaled display connected to a computer.

The position of the large-scaled display is conventionally determined to allow each worker to check the display without any specific movement, that is, only by taking into account the visual recognizability of the display. In some cases, it is rather difficult for the worker to check the display during an operation, so that the display of information does not sufficiently contribute to the improvement in working efficiency. No sufficient discussion has been made on the position of the display effective for operations that require movements.

The information conventionally displayed on the large-scaled display in the factory mainly includes the target values of management and the actual values. In the factory, for the enhanced productivity, accurate transmission of information is required between different sections that are involved in production. For example, parts should be supplied from a warehouse of the parts to an assembly line with a progress of the assembling operation. The conventional display does not allow the advantages of the large-scaled display to sufficiently contribute to transmission of information between the different sections.

In the factory, it is often required for different sections that are isolated from each other across the wall to intimately transmit the information. The transmission of information between the different sections, however, conventionally relies on rather personal communication of individual workers. It is accordingly difficult for all the workers in each section to obtain the consistent information without delay. Such deficiency of the information transmission may interfere with smooth operations in the respective sections.

The factory generally has a management section that manages production. The management section conventionally does not use a large-scaled display for production management but causes information, for example, regarding the actual conditions of production lines to be displayed in a computer provided for each manager. This method enables each manager to actually see only part of the information. Various pieces of information may thus not be sufficiently used for the production management. Since each manager requires a diversity of information, it is unpractical and inefficient to display all such information on the large-scaled display. The prior art management system accordingly requires some improvement in the arrangement of making the respective managers in the management section share the information.

The object of the present invention is thus to enable information to be shared in a factory and a warehouse by utilizing a large-scaled display, so as to enhance the workability.

SUMMARY OF THE INVENTION

At least part of the above and the other related objects is attained by a management system of a first arrangement that manages either of production in a factory and distribution in a warehouse. The management system of the first arrangement includes: an input terminal that inputs an instruction and an actual condition with regard to at least one of storage and shipment of an article in a predetermined storehouse as occasion demands; a memory device that stores information regarding the input instruction and actual condition therein; and a large-scaled display that displays the instruction and the actual condition stored in the storage device, such as to make the display recognizable by substantially anyone in the predetermined storehouse without delay. The large-scaled display is located at a specific position on a worker's flow line in the predetermined storehouse, which allows the display and the article to be recognized simultaneously. Here the instruction may be, for example, a work plan regarding the place of storage, the object of storage, and the numerical quantity of storage. The actual condition may be current conditions of these items.

The input terminal is any terminal that enables predetermined pieces of management information to be input as occasion demands, for example, a general-purpose computer. The 'large-scaled' is not restricted to the size that enables all the workers in a section where the display is located to readily see the display, but may be the size that enables most of the workers in the section to see the display. The actual dimensions of the display are arbitrarily set in each section where the display is located.

The management system of the first arrangement enables each worker to actually carry out the operation for storage or the operation for shipment while checking the instructions and the actual conditions with regard to storage or shipment. This enhances the efficiency of such operations. In the case where the actual conditions differ from the instructions, this arrangement advantageously enables a manager to readily find the difference.

When there is some delay in the work flow, the large-scaled display functions to inform each worker of the delay. This may be the motivation of each worker who tries not to cause a delay in the course of the operation, thus enhancing the working efficiency.

The first arrangement may be actualized by an application that causes the instructions and the actual conditions with regard to both storage and shipment to be collectively displayed on one large-scaled display, an application that causes the instructions and the actual conditions with regard to either of storage and shipment to be displayed on one large-scaled display, or an application that causes the instructions and the actual conditions with regard to storage and those with regard to shipment to be displayed separately on individual large-scaled displays.

When the first arrangement is applied to a storehouse that includes a plurality of storage lanes of the article provided according to destinations of the shipment, it is preferable to display the instruction and the actual condition corresponding to each of the plurality of storage lanes. This is because the storage lane is one of the most important pieces of information in management of physical delivery in the warehouse. The storage lane is the piece of information common to the operation for storage and the operation for shipment. The display of the storage lane as the key information advantageously enables the information on the storage operation to be readily compared with the information on the shipment operation.

A variety of settings may be applied for the display.

For example, the information regarding the storage operation may be an instruction with regard to a type of the article to be stored and an instruction and an actual condition with regard to a numerical quantity of the article to be stored. They are the most important pieces of information in storage operation.

The information regarding the shipment operation may be, for example, an instruction with regard to a destination of the article to be shipped, an instruction with regard to a numerical quantity of the article to be shipped, and an actual condition with regard to a numerical quantity of the article that has already been shipped. They are the most important pieces of information in shipment operation.

In accordance with one preferable application, in the case of display of the information on the storage operation, the large-scaled display is located at a predetermined position that allows the display to be recognized from at least either one of a preprocess area, where a predetermined required preprocess is performed prior to storage of the article in the predetermined storehouse, and an entrance to the predetermined storehouse. Here the preprocess is, for example, a process of packing the products or a process of registering the serial numbers allocated to the products shipped. The location of the large-scaled display to be visually recognizable from the preprocess area enables each worker in the preprocess area to check the details of the operation and the actual conditions while waiting for a next flow of the preprocess. This enhances the workability. The location of the large-scaled display to be visually recognizable from the entrance enables each worker to check the details of the operation and the actual conditions when entering the storehouse. This reduces the wasteful movements of the worker in the subsequent steps of the storage operation and thereby enhances the workability.

The present invention is also directed to a management system of a second arrangement that manages production in a factory, wherein the factory includes a first section that manufactures products and a second section that supplies either of parts and materials used for the manufacture of the products. The management system of the second arrangement includes: a first input terminal that inputs requirement regarding requirement for either of the parts and the materials in the first section as occasion demands; a second input terminal that inputs delivery status with regard to the required parts or materials; a memory device that stores the input requirement and the input delivery status therein; and a large-scaled display that displays the requirement and the delivery status stored in the memory device in at least one of the first section and the second section, such as to make the display recognizable by substantially anyone in at least one of the first section and the second section without delay.

This arrangement enables all the workers in a section where the large-scaled display is located to share the requirement of the parts or the materials and the delivery status. The collective display of the requirement and the delivery status causes each worker to accurately check the actual conditions with regard to the supply of the parts or the materials in the two sections. The delivery of the parts or the materials and the manufacture of the products may be adjusted, based on the display of such information. This enhances the production efficiency.

The second arrangement is especially effective when the first section and the second section are located in such a manner that it is difficult for one of the first section and the second section to directly observe the working status of the other. In such cases, it is preferable that the large-scaled display is located in the section having difficulty in direct observation. In the case where two sections are parted from each other by the wall or another obstacle or in the case where two sections are in different buildings, it is difficult for both the two sections to directly observe the other. In such cases, it is preferable that large-scaled displays are individually located in the two sections. In the case where the other section is arranged behind one section where the workers face the direction opposite to the other section during the operation, it is difficult for one section to directly observe the other section. The workers in the other section readily see the state in one section that is arranged in front of the other section, but the reverse has difficulties. In such cases, a large-scaled display is located in one section to allow both the sections to see the state of the other. Another large-scaled display may also be located in the other section arranged behind one section.

When the second arrangement is applied to a factory having a plurality of production lines for manufacturing products, it is preferable that the large-scaled display displays the requirement and the delivery status corresponding to each of the plurality of production lines. This is because the line is the important and minimum unit in management of production.

The present invention is further directed to a management system of a third arrangement that manages production in a factory. The management system of the third arrangement includes: an upstream process input terminal that inputs an actual condition of a specific upstream process in a production flow in the factory as occasion demands; a shipment input terminal that inputs a shipping status of products as occasion demands; a memory device that stores the input actual condition of the specific upstream process and the input shipping status; and a large-scaled display that simultaneously displays the actual condition of the specific upstream process and the shipping status stored in the memory device in a management section that manages the production flow, such as to make the display recognizable by substantially anyone in the management section without delay.

The final target of production management in a factory is smooth accomplishment of the last process downstream most in the production flow, that is, shipment from the factory as scheduled. The shipping status is the most important pieces of information in production management. The shipment process is naturally in close relation to the conditions of the upstream processes. There are a limited number of specific processes that significantly affect the shipping status; for example, a delay in a certain process can not be compensated by the acceleration of other processes. The process having the most significant influence is the first process upstream most in the production flow, that is, the process of supplying materials and parts from outside. When required materials and parts are not supplied from an outside supplier according to plan, any modification of production lines does not ensure shipment as scheduled. The management system of the third arrangement enables all the managers in the management section to share such important pieces of information in real time, thus allowing required measures to be flexibly and quickly taken against a change of the situation like the modified production plan. This effectively prevents the stop of production lines and the extreme delay of shipment, thus ensuring the efficient operations in the factory. The simplest application displays the information regarding the actual conditions of the first process and the shipping status simultaneously.

In accordance with one preferable application of the third arrangement, another large-scaled display that displays the actual condition of the specific upstream process and still another large-scaled display that displays the shipping status are respectively located in related sections corresponding to the specific upstream process and the shipment. The application may include both of these large-scaled displays or only one of them. This enables the workers in the respective sections to accurately grasp the current situations and then positively take required measures for the improvement in situation.

In accordance with another preferable application of the third arrangement, information on a primary intermediate process may be displayed in addition to the above pieces of information. For example, the assembling status at assembly lines may be displayed together. This application enables the workers to readily grasp the current situation and modify the production plan according to the situation.

In accordance with still another preferable application of the third arrangement, the memory device is a server that provides a client connecting with the Internet with the information stored therein via the Internet, in response to a requirement from the client. The client at a remote place with a browser installed therein can readily obtain the information stored in the memory device. For example, this application enables the client to easily grasp the production status at an overseas factory. Namely this application enables workers in sections at remote places to share the information. The client may be a general-purpose computer, so that such information sharing is attained at a relatively low cost.

The present invention is also directed to a management system of a fourth arrangement that manages production in a factory, wherein at least three areas including a product storage area where products are stored, an assembly area where the products are assembled, and a supply storage area where either of materials and parts to be supplied to the assembly area is stored, are arranged in the factory not to allow any one of the three areas to directly observe actual conditions of the others. Each of the three areas has an input terminal that inputs a working status of the area and a large-scaled display that displays the working status in response to the input. The management system of the fourth arrangement further includes: a network that transmits information regarding the working status of one of the three areas to another area that is present in the factory; and a large-scaled display that displays the transmitted information in the another area. The transmitted and displayed information may be unprocessed, raw data input in these areas or resulting information processed at the input terminals.

This arrangement causes the related pieces of information to be individually displayed on the large-scaled displays in the respective areas, while enabling the important pieces of information to be shared in another area in the factory. Here the assembly area is not restricted to the main assembly line of the products. When there are a plurality of assembly areas including subassembly areas of parts, the input terminal and the large-scaled display should be located in at least one of these assembly areas. In such cases, it is naturally preferable that the input terminal and the large-scaled display are located in a specific area having the most significant effects on the total productivity.

The another area may be other than the three areas mentioned above. For example, the another area is a management section that manages a production flow in the factory. As discussed previously with regard to the third arrangement, the application of displaying the important pieces of information in the management section enables each manager in the management section to flexibly manage the production according to the situation without delay.

The another area may be an upstream process area corresponding to an upstream process, which is prior to a process performed in the area where the transmitted information is input. The application of displaying the working status of a downstream process area in the upstream process area ensures the smooth production in the whole factory. In one example, it is assumed that there is a delay in shipment of a certain product, although the required quantity of the product for shipment is fulfilled. In such cases, the situation is displayed in each upstream process area, for example, the assembly area, as the information from the product storage area. This enables each upstream process area to prepare for expected modification of the production plan according to the change of the shipment plan and deal with actual modification of the production plan without much confusion. The application of displaying the information in the upstream process area enables the upstream process area to smoothly and quickly take required measures against a change of the situation, thus enhancing the flexibility of production.

In the case of displaying the information in the upstream process area, the information input in the supply storage area, which corresponds to the first process upstream most in the production flow, is excluded from the transmitted information. The information transmitted regards the working status in at least one of the residual two areas. The upstream process area may be other than the three areas mentioned above. When there are upstream process areas other than the supply storage area, which correspond to, for example, parts working processes and parts sub-assembling processes prior to the assembly of products, the working status of the assembly area may be displayed in such upstream process areas.

In the fourth arrangement, the transmitted information may be displayed in a separately provided large-scaled display. When the information is transmitted to an area where the large-scaled display is located for displaying the actual conditions of the area, the large-scaled display may display the transmitted information simultaneously with the information on the actual conditions of the area. This arrangement may be adopted in the case where the information regarding the working status in one of the above three areas is transmitted to at least one of the residual two areas. The transmitted information may, of course, be displayed separately from the information of the area.

The display of the transmitted information may not be identical with the display in the area where the information is input. Only part of the input information may be extracted for transmission.

The large-scaled display of the present invention may be a projector-type liquid crystal display. The projector-type liquid crystal display takes a relatively low cost for installation and enables flexible adjustment of the size of the display screen. The projector-type liquid crystal display directly projects the display screen of the general-purpose computer, thus enabling the contents of the display to be flexibly changed. The large-scaled display is not restricted to the projector-type liquid crystal display, but any of electric display panels, displays, and other equivalent devices is applicable. Another available example is a digital display panel that does not utilize light for displaying information but mechanically drives a large number of display plates to change the contents of the display.

The technique of the present invention may be attained by a diversity of applications that are more restrictive than the management system discussed above, for example, a parts distribution management system and a physical delivery management system in a warehouse. The principle of the present invention is also actualized by a management method that corresponds to any of the above management systems.

In the case where the management systems discussed above utilize a computer, the technique of the present invention is actualized by programs that attain the various functions of the management systems, a variety of signals that are equivalent to the programs, and recording media in which the programs are recorded in a computer readable manner. Typical examples of the recording media include flexible disks, CD-ROMs, magneto-optic discs, IC cards, ROM cartridges, punched cards, prints with barcodes or other codes printed thereon, internal storage devices (memories like a RAM and a ROM) and external storage devices of the computer, and a diversity of other computer readable media.

BRIEF DESCRIPTION OF THE DRAWINGS

FIG. 2 shows the display contents of the image projected by the liquid crystal projector;

FIG. 8 shows the contents of the display in the second embodiment;

FIG. 10 shows the contents of the display regarding the status of parts stock;

FIG. 12 shows the contents of the display regarding the status of shipment;

FIG. 14 shows the contents of the display in the parts warehouse; and

DESCRIPTION OF THE PREFERRED EMBODIMENTS

Figure 1:
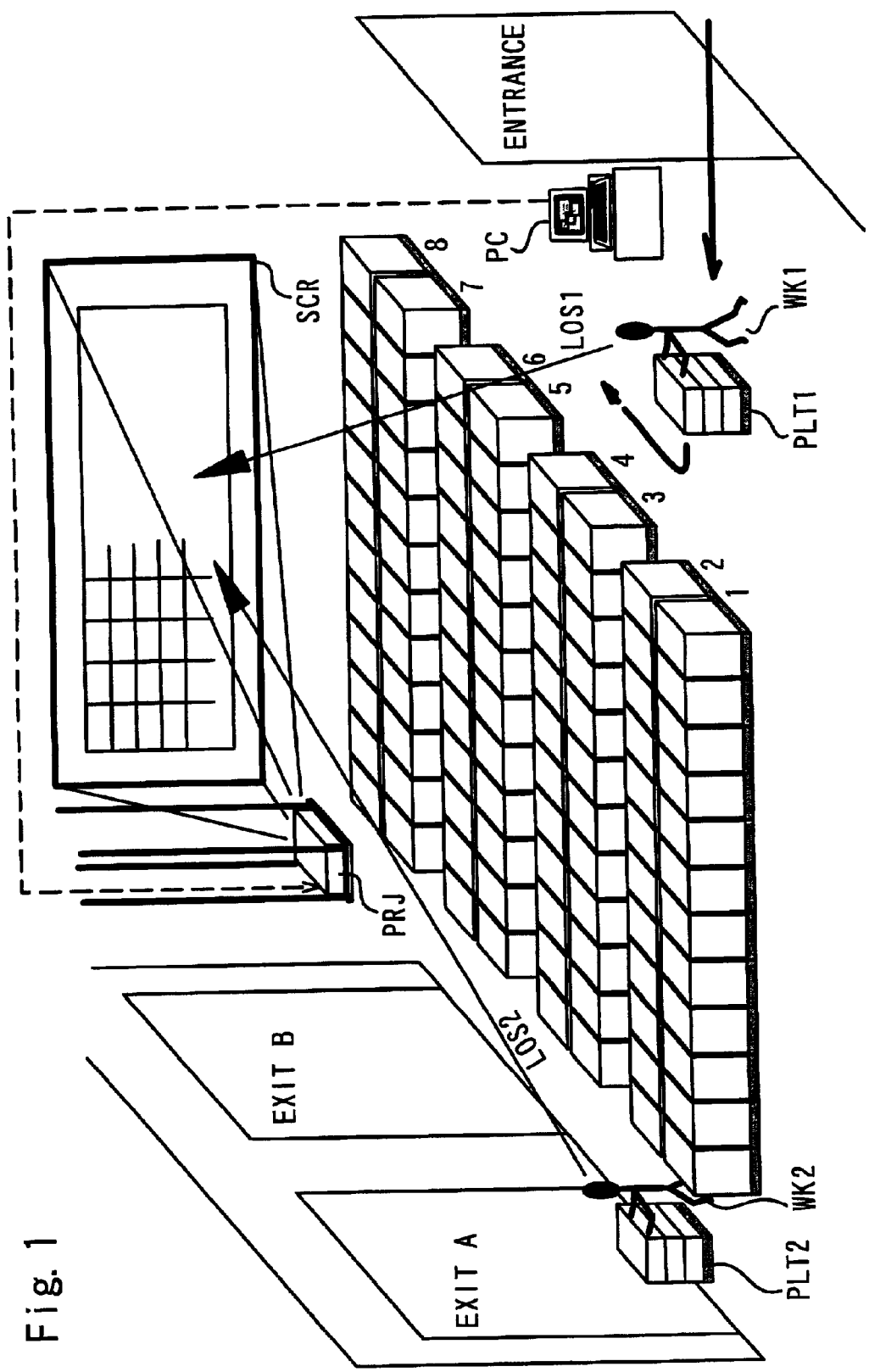
FIG. 1 illustrates the configuration of a management system in a first embodiment of the present invention.

Some modes of carrying out the present invention are discussed below in the following sequence:

A. First Embodiment: Application to Storehouse
A1. Modified Examples: Modifications of Display
B. Second Embodiment: Application to Parts Distribution
C. Third Embodiment: Application to Management Section
C1. Modified Example: Modification of Information Sharing
D. Fourth Embodiment: Information Supply to Upstream Process Areas A. First Embodiment: Application to Storehouse FIG. 1 illustrates the configuration of a management system in a first embodiment of the present invention. In this embodiment, the technique of the present invention is applied to a storehouse, which stores products manufactured in a factory. The technique is also applicable to a warehouse outside the factory.

A worker WK1 carries products mounted on a pallet PLT1 through an entrance into the storehouse. The worker WK1 locates the palette PLT1 in one of lanes 1 to 8 according to the type of the products as previously arranged. The lanes 1 to 8 respectively correspond to eight shipping containers. As for a certain lane where a planned number of the products is prepared, a worker WK2 carries out a palette PLT2 located in the certain lane through an exit A or an exit B. A motor truck with a container mounted thereon waits at each exit. The palette PLT2 is loaded on the container corresponding to the certain lane for shipment.

The management system of the first embodiment manages operations performed by the worker WK1 and the worker WK2 in the storehouse. The management system includes a computer PC, a liquid crystal projector PRJ, and a screen SCR. The liquid crystal projector PRJ causes an image identical with a display screen on a display of the computer PC to be projected on the screen SCR.

A general-purpose personal computer may be applied for the computer PC. The computer PC functions as an input terminal that inputs plans and actual conditions with regard to carrying-in and carrying-out operations at the storehouse, a memory device that stores information regarding the plans and the actual conditions therein, and a controller that controls the display of the liquid crystal projector PRJ.

The screen SCR for display is positioned by taking into account the visual recognizability by the worker WK1 and the worker WK2 during their operations. The screen SCR is accordingly located at a specific position that allows both the worker WK1 and the worker WK2 to simultaneously observe the projected image and the lanes as discussed below.

The worker WK1 enters the storehouse through the entrance and moves along a passage in the storehouse to each lane as indicated by a flow line of arrows. The worker WK1 can see the display on the screen SCR along this flow line as shown by an arrow LOS1. Simultaneously the worker WK1 can observe the actual storage status of the products in each lane. The worker WK2 draws a flow line that connects the lanes 1 to 8 with the exits A and B. The worker WK2 can see the display on the screen SCR along this flow line as shown by an arrow LOS2. Simultaneously the worker WK2 can observe the actual shipping status with regard to each of the lanes 1 to 8.

A diversity of positions that ensure the visual recognition are applicable for the specific position where the screen SCR is located. In the configuration of the first embodiment, for example, the screen SCR is located on the extension of lines connecting predetermined positions on the respective flow lines with the lanes. The screen SCR is positioned at a sufficient height, so that the products stored in the storehouse do not reduce the visual recognizability of the screen SCR.

The screen SCR has dimensions that are determined by taking into account the space of the warehouse and allow each worker to sufficiently check the display.

FIG. 2 shows the display contents of the image projected by the liquid crystal projector. Plans and actual conditions with regard to the carrying-in and carrying-out operations are displayed in the projected image. The display includes the lane, the product code, the shipment plan, the quantity of shipment, the quantity of current storage, the truck number, the arrival plan, the arrival time, the number of pallets, the number completed, and the shipping status. The 'lane' represents the lane number allocated to each of the lanes (1 to 8 in this embodiment) in the storehouse. The 'product code' represents the code allocated to the products that are to be stored in each lane. The 'shipment plan' represents the planned time of shipment. The 'quantity of shipment' represents the number of products to be shipped. The 'quantity of current storage' represents the number of products currently stored in the storehouse. The 'truck number' represents the code allocated to the motor truck on which the container is loaded for shipment. The 'arrival plan' represents the planned time of arrival of the motor truck for shipment. The 'arrival time' represents the actual time of arrival. The 'number of pallets' represents the total number of pallets to be loaded on the motor truck and is obtained by converting the quantity of shipment into the unit of pallets. The 'number completed' represents the number of pallets that have already been loaded on the motor truck. The 'shipping status' represents the progress of the shipping operation.

In the example of FIG. 2, the products with the product code 'AAA' are stored in the lane 2. The quantity of shipment is 966, whereas the quantity of current storage is 966. This means that the production has already been completed. The motor truck has arrived at nine thirty, and 18 out of the total 20 pallets have already been loaded on the motor truck. Namely the shipping status is 'under loading'. The lanes 6 and 1 are under manufacture of the products. The shipment has already been completed with regard to the lanes 3 and 8.

The lane, the product code, the shipment plan, and the quantity of shipment are pieces of information on the plan or instructions with regard to the carrying-in operation at the storehouse. The quantity of current storage is a piece of information on the actual conditions of the carrying-in operation. The lane, the product code, the arrival plan, the arrival time, and the number of pallets are pieces of information on the plan or instructions with regard to the carrying-out operation. The number completed and the shipping status are pieces of information on the actual conditions of the carrying-out operation. The pieces of information handled are not restricted to these settings but may be set arbitrarily according to the purpose of the management.

The information on the plans or instructions is input into the computer PC in advance by a manager. The information on the actual conditions is input into the computer PC and updated according to the requirements by the manager or the worker with a progress of the operation. These pieces of information may be input from another computer connecting with the computer PC via a network.

Figure 3:
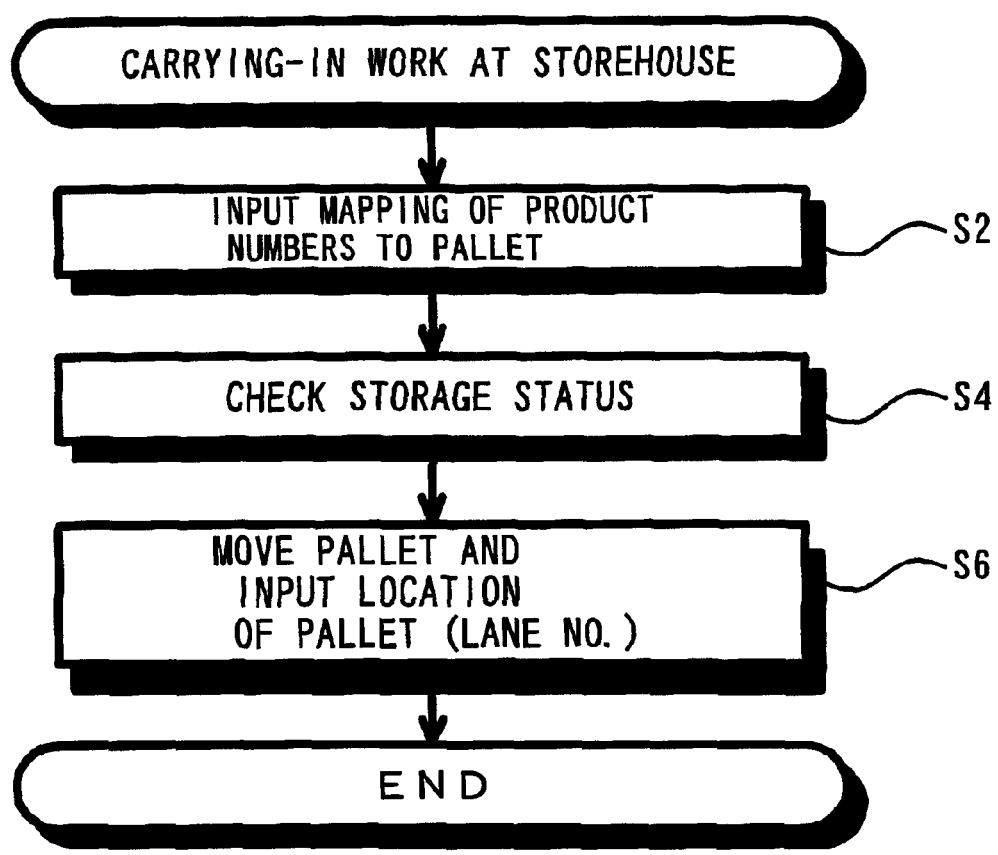
FIG. 3 is a flowchart showing a work flow of carrying-in operation at the storehouse.

The following discusses flows of the carrying-in operation and the carrying-out operation that are accompanied with the information updating. FIG. 3 is a flowchart showing a work flow of the carrying-in operation at the storehouse. The worker WK1 inputs the mapping of product numbers to a pallet when carrying products into the storehouse (step S2). A plurality of products are collectively wrapped on a pallet, so that serial numbers of the products wrapped are mapped to an identification number allocated to each pallet. This operation may be performed at the time when the products are wrapped on the pallet or at the time when the pallet is carried into the storehouse. One applicable method manually inputs the identification number of the pallet and the serial numbers of the products. Another applicable method reads the identification number and the serial numbers with a barcode reader. The serial numbers of the products correspond to the number of products wrapped on the pallet. Namely the input of the serial numbers specifies the number of products newly carried into the storehouse. The input pieces of information are stored in the computer PC as part of the information on the actual conditions with regard to the carrying-in operation.

The worker WK1 then watches the display on the screen SCR to check the storage conditions of each lane (step S4). The worker observes the display regarding the lane, the product code, the quantity of shipment, and the quantity of current storage and readily selects the lane of interest in which the currently carrying pallet is to be located. The arrangement enables the worker to simultaneously check the actual storage status in the lane of interest. The worker can thus visually judge the validity of the selection in an instant. In one example, it is assumed that the worker overlooks the product code and mistakenly selects the lane of interest based on only the quantity of shipment and the quantity of current storage. In such cases, the worker immediately notices the misjudgment since the package of the products stored in the lane of interest is different from the package of the currently carrying products. As for the numerical quantity, the worker readily judges the validity of the selection, based on the empirically obtained sense of quantity. In the case where the worker notices any misjudgment, the worker rechecks the display to change the selection. The information is displayed on the large screen SCR, so that the worker can perform the check and section in the course of the carrying-in operation of the products. Compared with the case where information is displayed only on the display of the computer PC, this arrangement advantageously enhances the working efficiency.

After the selection of the lane of interest, the worker WK1 moves the pallet and inputs the lane number allocated to the lane of interest, to which the pallet is moved, into the computer PC (step S6). The input may be performed by the worker WK1 or a specified manager. The input lane number is stored in the computer PC as one piece of the information on the actual conditions with regard to the carrying-in operation. The system of modified structure uses sensors disposed on each lane, so as to allow the lane of interest to be input automatically. The pallets have a fixed size. The automatic input system is easily constructed by arranging sensors that detect the presence of the pallet, for example, photo sensors, at fixed intervals on each lane and wiring the sensors to transmit their detection signals to the computer PC. For the strict mapping of the pallet to the lane of interest, the sensors disposed on each lane may automatically read barcodes or other identification information on the pallets or the products mounted thereon. The computer PC specifies what number of products are newly carried in and which lane, based on the input information on the lane of interest and the previously input product numbers. The computer PC updates the display of the 'quantity of current storage', based on the specification. Alternatively the worker may directly input the 'quantity of current storage' in the course of the carrying-in operation.

Figure 4:
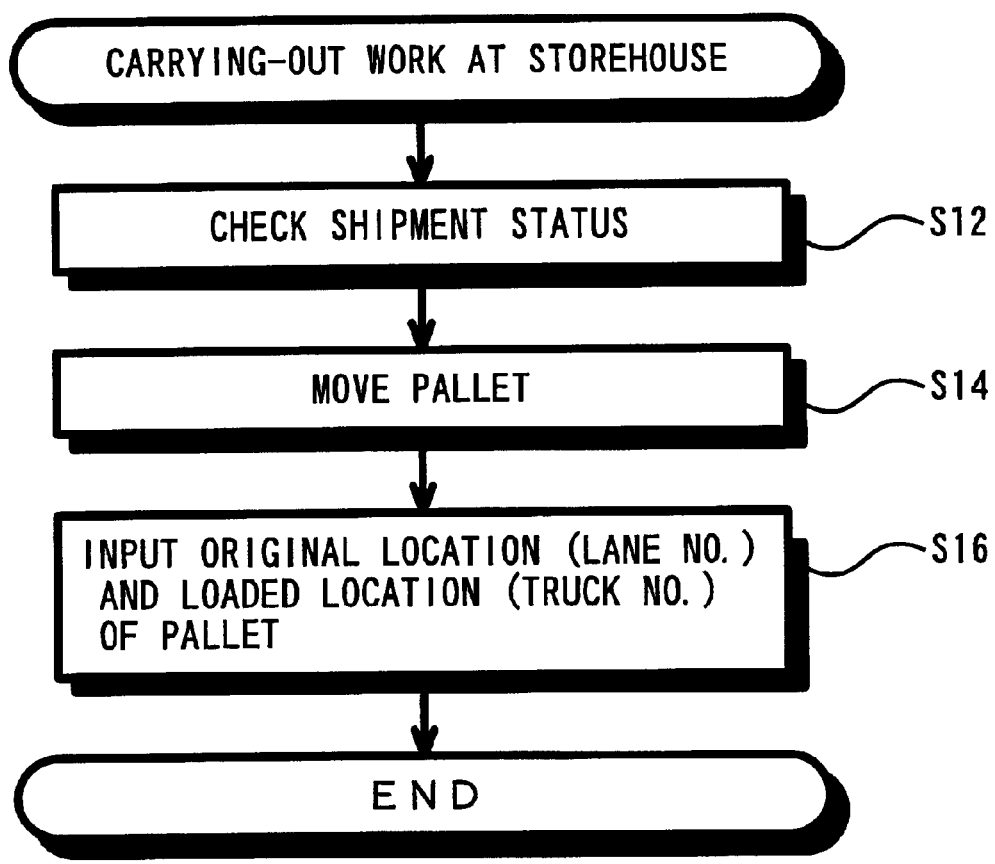
FIG. 4 is a flowchart showing a work flow of carrying-out operation at the storehouse.

The information with regard to the carrying-out operation is updated in the following manner. FIG. 4 is a flowchart showing a work flow of the carrying-out operation at the storehouse. The worker WK2 watches the display on the screen SCR to check the shipment conditions (step S12). The worker observes the display regarding the lane, the arrival time, the number of pallets, and the number completed and readily selects the lane of interest from which the products are to be loaded on the motor truck. The arrangement enables the worker to simultaneously check the actual shipping status of each lane and thus visually judge the validity of the selection, as in the case of the carrying-in operation.

The worker WK2 moves the pallet according to the selection (step S14) and inputs the information specifying which lane the pallet is moved from and what motor truck the pallet is loaded on, into the computer PC (step S16). The input may be performed by the worker WK2 or a specified manager. The system of modified structure uses sensors disposed on each lane, so as to allow the movement of the pallet to be automatically detected. The computer PC is located in a neighborhood of the entrance in the embodiment shown in FIG. 1. The computer PC may alternatively be located in the middle of the entrance and the exit to enhance the convenience of inputting the information with regard to the carrying-out operation. Another modified structure separately provides a computer for inputting the information with regard to the carrying-in operation and a computer for inputting the information with regard to the carrying-out operation, which are connected to each other via a network to allow the information sharing.

In the management system of the first embodiment discussed above, the large display of the information by means of the liquid crystal projector PRJ allows the worker to check the contents of the display during the operation. This arrangement enables the worker to simultaneously observe the display and the lane and thus visually judge the validity of the recognition on the display in an instant. This ensures the smooth and efficient operations.

The large display enables the workers in the storehouse to share the information in real time. Each of the workers who participate in the carrying-in operation or the carrying-out operation accurately grasps the instructions and the actual conditions of the operation and independently performs the operation.

Unlike the case of displaying the information only on the display of the computer PC, the large display readily causes each worker to know the fact and the cause of a delay in the work flow. This is dishonorable for the worker who causes the delay in the work flow. Because of such psychological factors, the large display works as the motivation of each worker who tries not to cause a delay in the course of the operation, thus contributing to the enhancement of the working efficiency in the storehouse.

As described previously with regard to the carrying-in operation, preprocess including the input of product numbers is performed prior to the storage of the products. In the first embodiment, it is preferable that the location of the screen SCR is determined to allow each worker to simultaneously observe the display and the lane during the preprocess. Such arrangement enables the worker to check the instructions and the actual conditions of storage while waiting for completion of the preprocess, thus further enhancing the working efficiency.

A1. Modified Examples: Modifications of Display

Figure 5:
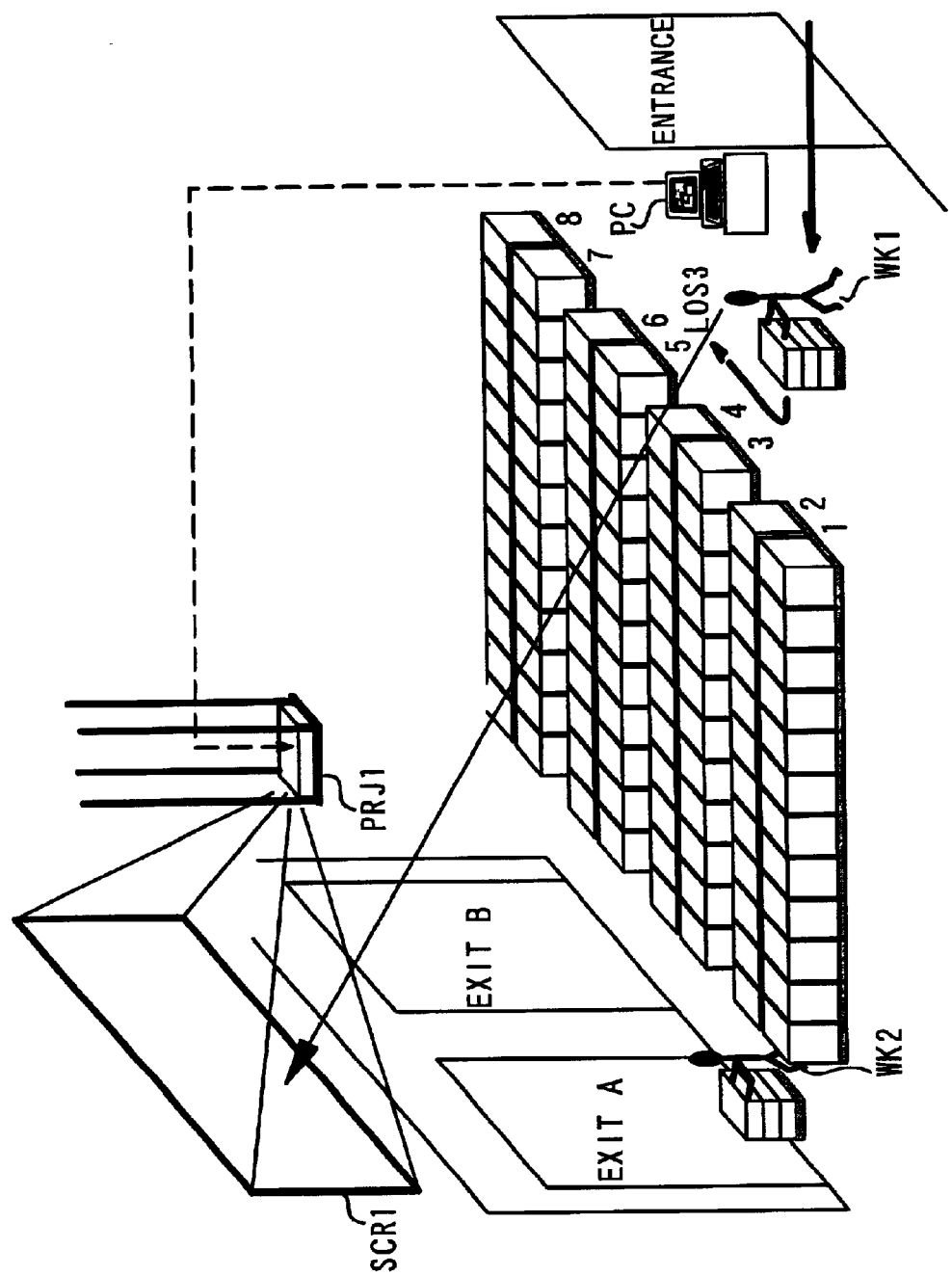
FIG. 5 shows the modified configuration of the management system in a first modified example.

A diversity of modifications may be applied for the position of the information display by the management system of the first embodiment. FIG. 5 shows the modified configuration of the management system in a first modified example. In the first modified example, the location of a liquid crystal projector PRJ1 and a screen SCR1 is determined to enhance the convenience of the worker WK1. The screen SCR1 is positioned in front of the entrance. In the illustrated example, the entrance and the exits are located on opposite sides, so that the screen SCR1 is set above the exits A and B. This arrangement enables the worker WK1 to see the display as defined by an arrow LOS3 and simultaneously check the actual storage status of each lane, when entering the storehouse through the entrance.

Figure 6:
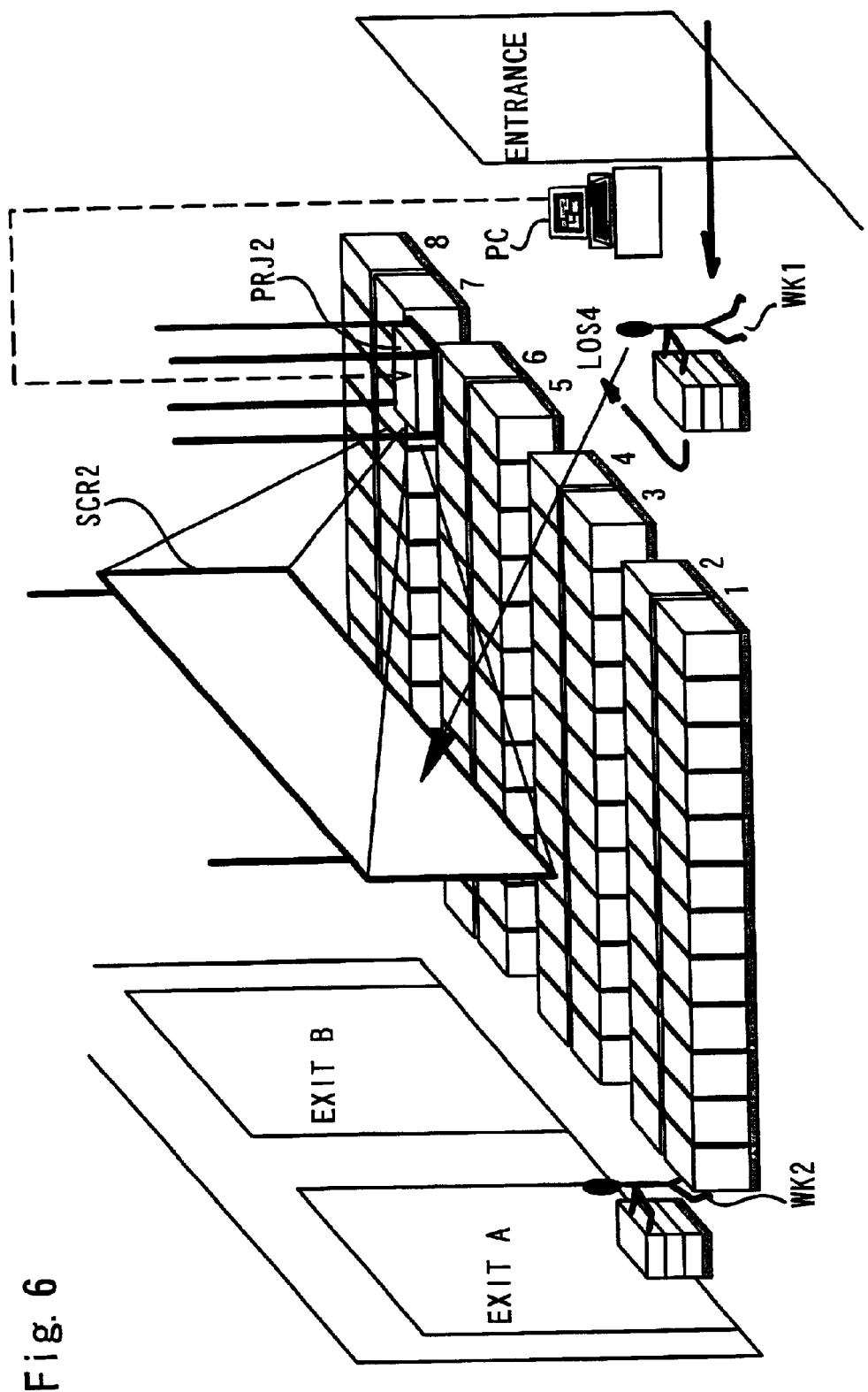
FIG. 6 shows the modified configuration of the management system in a second modified example.

The location of the screen is not restricted to the wall surface. FIG. 6 shows the modified configuration of the management system in a second modified example. In the second modified example, a screen SCR2 and a liquid crystal projector PRJ2 are suspended. The screen SCR2 is positioned in front of the entrance. The position of the screen SCR2 in the second modified example is close to the flow line of the worker WK1. This advantageously facilitates the recognition of the display by the worker WK1.

In the first modified example and the second modified example, the workers WK2 who participate in carrying-out work have difficulties in checking the displayed information. It is accordingly preferable that another display is provided separately for the workers WK2 of carrying-out work. In such cases, the information displayed for the workers WK2 of carrying-out work may be different from the information displayed for the workers WK1 of carrying-in work. Namely the display includes only the plan or instructions and the actual conditions relating to each operation. In the case where the display for the workers of carrying-in work is separate from the display for the workers of carrying-out work, the two displays are not essential. Only one of the two displays may be adopted by taking into account the advantages of the large display.

B. Second Embodiment: Application to Parts Distribution

Figure 7:
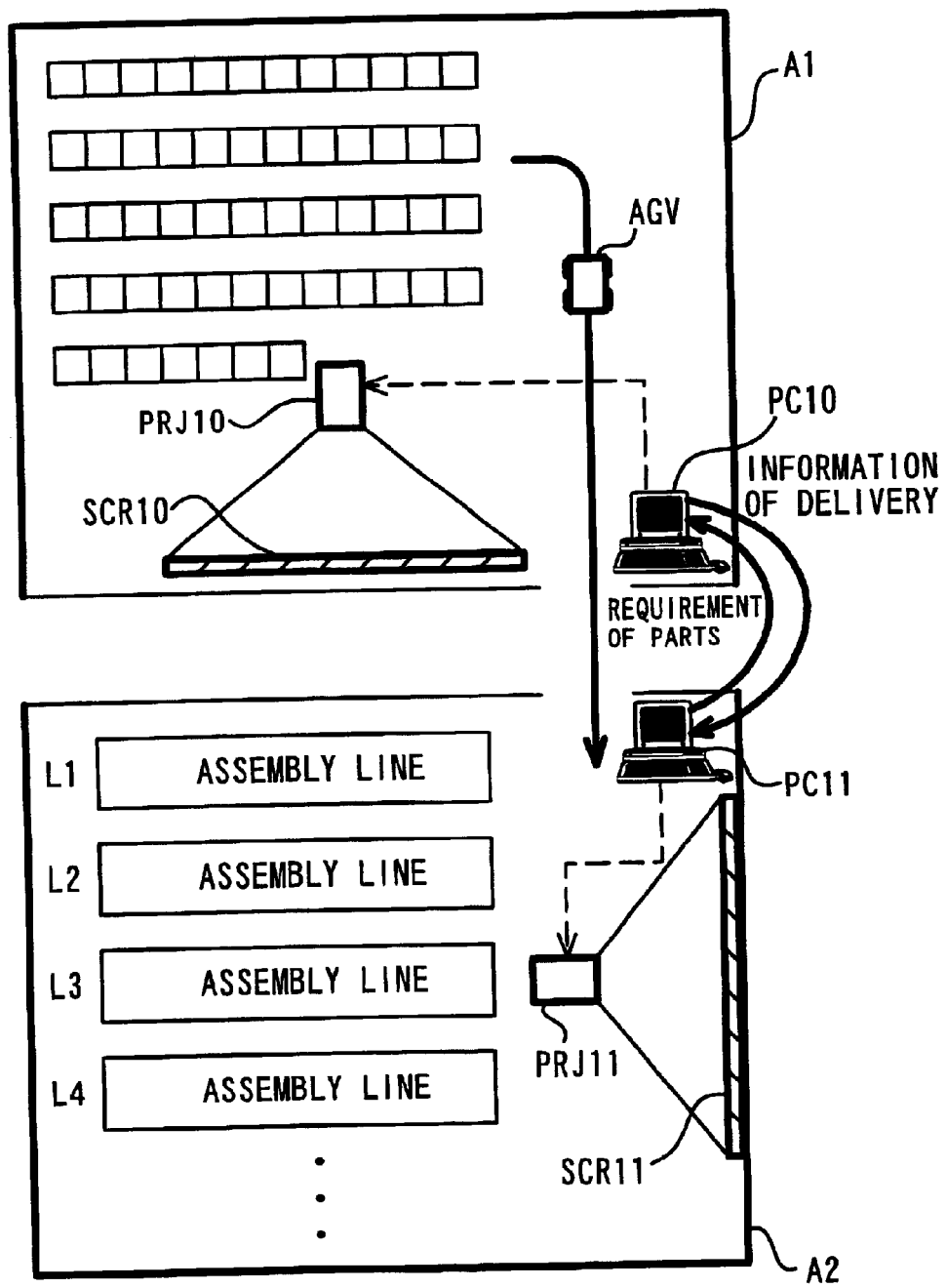
FIG. 7 illustrates the configuration of a management system in a second embodiment of the present invention.

FIG. 7 illustrates the configuration of a management system in a second embodiment of the present invention. This is a plan view of a factory. In the second embodiment, large display is applied for transmission of information between a parts warehouse A1 and an assembly area A2 in the factory.

The illustrated factory has two areas, that is, the parts warehouse A1 and the assembly area A2. These two areas are parted from each other across a passage, and it is difficult for each of the two areas to directly observe the status in the other area. The assembly area A2 includes a plurality of assembly lines L1, L2, ..., and a specific model of products are produced in each assembly line. A distribution worker is present in the assembly area A1 to distribute the parts to each assembly line. The distribution worker monitors the degree of consumption of the respective parts and requires the parts warehouse A1 to deliver the parts when necessary.

The parts corresponding to each model produced in the assembly area A2 are stored in the parts warehouse A1. The respective parts may be manufactured in the parts warehouse A1. A delivery worker is present in the parts warehouse A1 to deliver the parts in response to a requirement from the assembly area A2. The supply of required parts is loaded on an unattended carrier vehicle AGV and delivered to the assembly area A2. The distribution worker in the assembly area A2 receives the supply of the parts and distributes the parts to each assembly line.

The management system of the second embodiment is in charge of the transmission of information between the parts warehouse A1 and the assembly area A2. The parts warehouse A1 has a computer PC10, a liquid crystal projector PRJ10, and a screen SCR10 as part of the management system. The assembly area A2 has a computer PC11, a liquid crystal projector PRJ11, and a screen SCR11 as part of the management system. The computers PC10 and PC11 respectively function as input terminals for inputting the parts requirement and the parts delivery information, storage units for storing such information therein, and controllers for controlling the display by means of the liquid crystal projectors PRJ10 and PRJ11. The computers PC10 and PC11 are connected to each other via a network and thus share the information.

When the distribution worker in the assembly area A2 inputs a requirement for parts in the computer PC11, the parts requirement is transmitted to the computer PC10 in the parts warehouse A1 via the network. The parts requirement is displayed on the screen SCR10 by means of the liquid crystal projector PRJ10. When the delivery worker in the parts warehouse A1 inputs information regarding delivery of the required parts on the unattended carrier vehicle AGV in the computer PC10, the delivery status is transmitted to the computer PC11. The delivery status is displayed on the screen SCR11 by means of the liquid crystal projector PRJ11.

FIG. 8 shows the contents of the display in the second embodiment. As mentioned above, the display includes the parts requirement and the delivery status. In this embodiment, the parts requirement and the delivery status are displayed simultaneously in both the assembly area A2 and the parts warehouse A1. In a modified application, only the delivery status may be displayed in the assembly area A2, whereas only the parts requirement may be displayed in the parts warehouse A1.

The parts requirement includes the line number, the model name, the part number, the part name, the date, the time, and the quantity. The 'line number' represents the number allocated to the assembly line that requires a supply of parts. The 'model name' represents the type of the product manufactured in the assembly line. The 'part number' represents the code of the part required. The 'part name' represents the name of the part required. The 'date' and the 'time' specify the date and the time when the supply of the parts is required. The 'quantity' represents the numerical quantity of the part required. The parts requirement is not restricted to these settings, but may include arbitrary pieces of information required for the operations in the parts warehouse A1.

The delivery status includes the part number, the part name, the quantity, the destination, the date, and the time. The part number, the part name, and the quantity have the same meanings as those in the parts requirement. The 'destination' corresponds to the 'line number' in the parts requirement and specifies the assembly line of interest to which the supply of the parts is delivered. The 'date' and the 'time' specify the date and the time when the supply of the parts is delivered. The delivery status is also not restricted to these settings, but may include arbitrary pieces of information.

The management system of the second embodiment ensures the smooth transmission of information between the parts warehouse A1 and the assembly area A2, thus enhancing the production efficiency. The large display of the parts requirement and the delivery status in the parts warehouse A1 enables the worker at any position in the parts warehouse A1 to readily check the contents of the display and accurately identify the parts to be delivered in real time. This ensures the efficient delivery of the parts. The location of the screen SCR10 at the position that allows the display and the parts stored in the warehouse A1 to be observed simultaneously further enhances the working efficiency by the same functions as those discussed in the first embodiment. Another advantage of the large display is to enable each of plural workers who participate in the delivery work to accurately grasp the parts requirement and the delivery status and independently perform the operation. Because of the psychological factors similar to those discussed in the first embodiment, the large display works as the motivation of each worker who tries not to cause a delay in the course of the operation.

The large display in the assembly area A2 enables the worker to readily and accurately grasp the delivery status of the required parts in real time. The distribution worker can thus send an early requirement for parts according to the delivery status of the parts. The large display allows the worker at any position to check the contents of the display and readily grasp the parts requirement and the delivery status, thus ensuring the smooth operation. The workers and managers at the respective assembly lines can flexibly modify the production plan based on the contents of the display. This enhances the production efficiency.

Application of the large display for transmission of information between different sections in the factory enables a large number of workers and managers in the different sections to accurately check the mutual situations, thus ensuring the smooth operations.

The second embodiment may be modified for transmission of information among three or more different sections. The two large displays in the parts warehouse A1 and the assembly area A2 are not essential. Only one of the two displays may be adopted by taking into account the advantages of information sharing. The principle of the second embodiment is applicable not only to a plurality of areas arranged across the passage but to a diversity of arrangements of the plural areas where one area has difficulties in directly observing the status of the other. For example, the principle is applicable to a plurality of areas that are not parted from each other across the wall or the like but are apart from each other across a relatively large space and accordingly have difficulties in direct observation.

C. Third Embodiment: Application to Management Section

Figure 9:
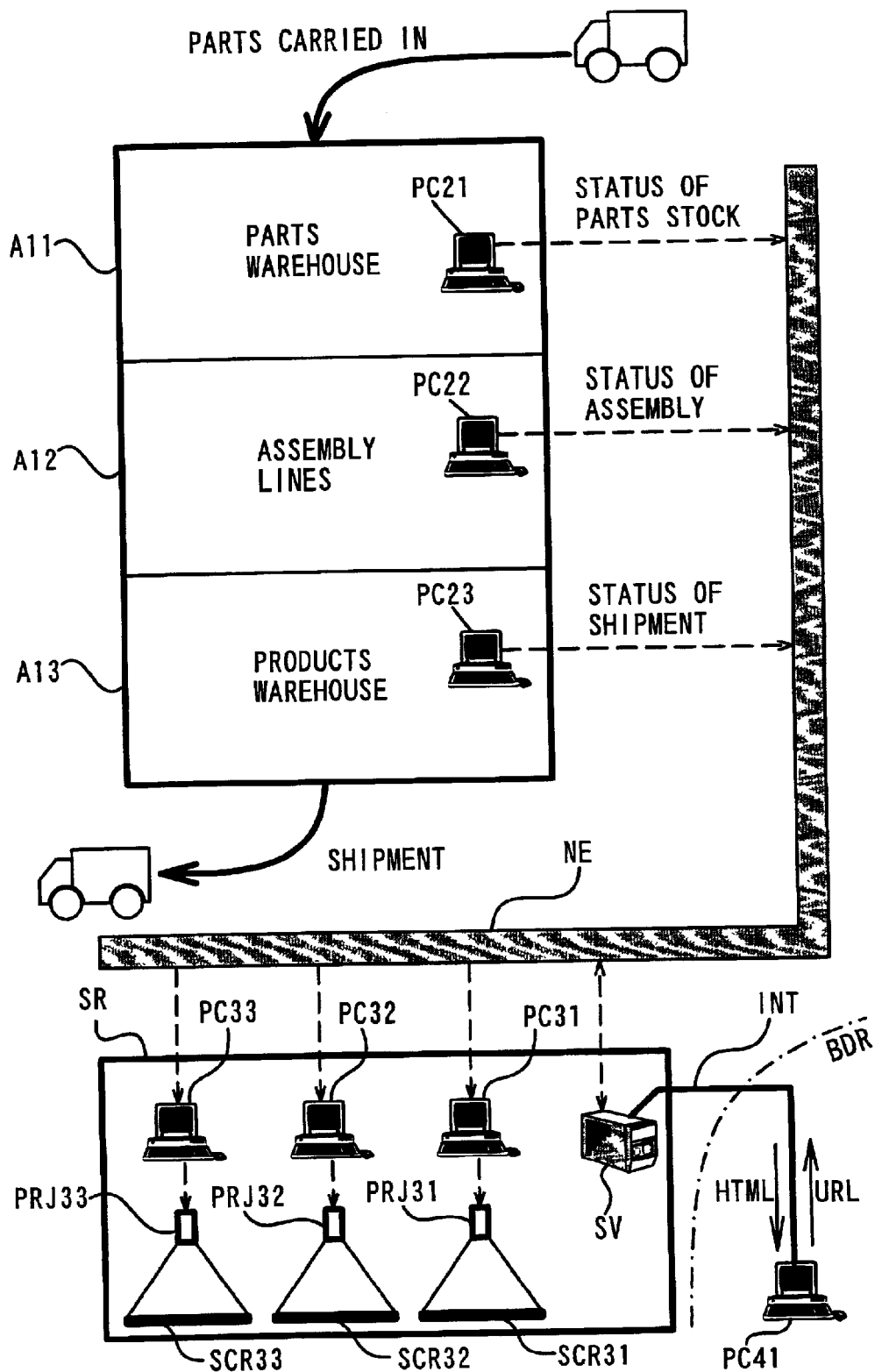
FIG. 9 illustrates the configuration of a management system in a third embodiment of the present invention.

FIG. 9 illustrates the configuration of a management system in a third embodiment of the present invention. The layout of a factory is shown schematically. The third embodiment regards an application to transmission of information between a management section SR and production fields of the factory, that is, a parts warehouse A11, assembly lines A12, and a products warehouse A13.

In the production fields of the factory, parts are carried into the parts warehouse A11 and assembled to products in the assembly lines A12. The products are stored in the products warehouse A13 and are shipped when reaching a predetermined numerical quantity. The process of carrying the parts into the parts warehouse A11 is accordingly the specific upstream process in the production flow in the factory, and the shipment from the products warehouse A13 corresponds to the last process downstream most in the production flow. The assembly lines A12 correspond to the intermediate process. In another application, materials are carried into the factory where parts are manufactured. In such cases, the process of carrying the materials into the factory is the specific upstream process.

Computers PC21, PC22, and PC23 are located in the respective sections in the production fields. These computers function as input terminals for inputting the actual conditions in the respective sections. The status of parts stock, the status of assembly, and the status of shipment are respectively input into the computer PC21 in the parts warehouse A11, the computer PC22 in the assembly lines A12, and the computer PC23 in the products warehouse A13. These computers are connected to a local area network NE in the factory and gain access to a server SV, which is also connected to the network NE, for transmission of information.

The management section SR is a staff room where managers who are in charge of production management in the factory are gathered. As schematically illustrated in FIG. 9, the management section SR is located on a different floor or in a different building from the production fields. The management section SR has three computers PC31, PC32, and PC33, liquid crystal projectors PRJ31, PRJ32, and PRJ33, and screens SCR31, SCR32, and SCR33. The respective computers, which are connected to the network NE, gain information from the server SV and cause the input information to be displayed by the corresponding liquid crystal projectors. The computer PC31, the liquid crystal projector PRJ31, and the screen SCR31 are used to display the status of parts stock. The computer PC32, the liquid crystal projector PRJ32, and the screen SCR32 are used to display the status of assembly. The computer PC33, the liquid crystal projector PRJ33, and the screen SCR33 are used to display the status of shipment. In the management section SR, the three sets of information are displayed in parallel in the sequence of the production flow as illustrated.

FIG. 10 shows the contents of the display regarding the status of parts stock. Here the display is specialized to the status of shortage of parts. The display includes the model name, the part number, the part name, the supplier, the requirement source, the date of requirement, the time of requirement, the status, and the delivery schedule. The 'model name' represents the model of the product that is short in parts. The 'part number' and the 'part name' represent the code and the name of the part that is in shortage. The 'supplier' specifies the name of the supplier that supplies the part. The 'requirement source' represents the section that requires a supply of the parts, for example, the assembly line number. The 'date of requirement' and the 'time of requirement' specify the date and time when the delivery of the parts is required. The 'status' represents the progress of the action taken against the shortage of the parts; for example, ordered to the supplier or wait for delivery from the supplier. The 'delivery schedule' specifies the date and time of expected delivery from the supplier. The display regarding the status of parts stock is not restricted to these settings but may be set arbitrarily according to the purpose of management.

Figure 11:
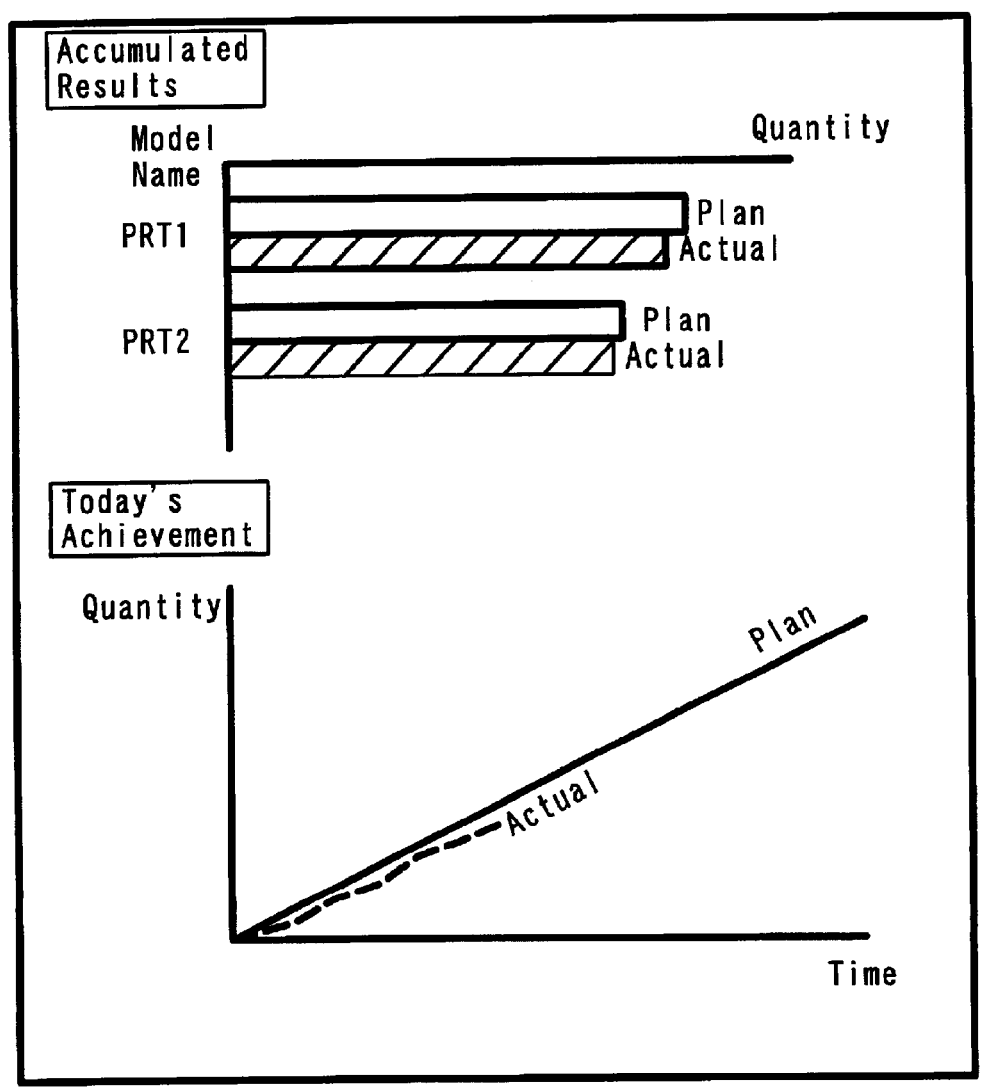
FIG. 11 shows the contents of the display regarding the status of assembly.

FIG. 11 shows the contents of the display regarding the status of assembly. The display of the assembly status includes the accumulated results and the today's achievement in the form of graphs. As the accumulated results, the numerical quantities of the production plan and the actual achievement with regard to each model are displayed in the form of bar graphs. For example, when the production plan is set by the unit of week, the display shows the numerical quantities of the production plan and the actual achievement by the unit of week. As the today's achievement, the numerical quantity of the today's production plan and the variation in quantity of actual production with time are shown in the form of line graphs. The display is not restricted to these settings but may be set arbitrarily according to the purpose of management. The status of assembly may be displayed in the form of tables, instead of the graphs. The display may be provided for each assembly line or for each process in the assembly line. The display may include information relating to the quality, for example, the rate of failure in each assembly line.

FIG. 12 shows the contents of the display regarding the status of shipment. The display of the shipment status includes the gate, the model name, the quantity, the destination, and the progress of shipment work. The 'gate' represents the number allocated to the exit. The 'model name' and the 'quantity' represent the model of products to be shipped and its numerical quantity. The 'destination' specifies the destination of shipment. The progress of shipment work is defined by the state of several boxes respectively corresponding to preparation of products, packing, documentation, formalities for shipment, and actual shipment. When each step of the shipment work is concluded, the corresponding box is filled. Such display enables visual recognition of the progress of the shipment work. The contents and the form of the display are not restricted to these settings, but may be set arbitrarily according to the purpose of management.

The server SV provides these pieces of management information in the HTML format. The server SV is connected to the Internet INT and works as a Web server that provides the management information in the HTML format in response to an URL (uniform resource locator) from an arbitrary computer PC41 on the Internet INT. For the security, the computer PC 41 is required to input a preset password for access. The computer PC41 uses a browser to browse the management information. The computer PC41 gaining access via the Internet may not be located in the factory but may be present in another nation cross a border BDR. This function enables the outside of the factory including overseas sections to grasp the working status of the factory in real time. For example, when the computer PC41 is present in a supplier of parts, the supplier readily checks the state of consumption of the parts for the timely supply. This arrangement ensures information sharing at a relatively low cost. The arrangement of providing information via the Internet INT is applicable to the first embodiment and the second embodiment discussed above. A server SV may be added to the configuration of each embodiment, or the computer that stores the respective pieces of information may function as the server SV.

The management system of the third embodiment allows the management section SR to readily and accurately grasp the actual conditions in the fields of production in real time. All the managers in the management section SR share the information. The ultimate purpose of production management is planned shipment from the factory, that is, the achievement of the last process, which is downstream most in the production flow, as scheduled. The process having the most significant effects on production is the carrying-in process of parts from the outside, which is upstream most in the production flow. The plurality of managers belonging to the management section SR are in charge of different parts of production management and require different pieces of information. The actual conditions of the first process and the last process are, however, important for all of the managers and are thus to be shared. The management system of the third embodiment enables the managers to share such important pieces of information in real time, thus ensuring the smooth production management.

The third embodiment additionally displays the status of assembly, which is the important pieces of information with regard to the intermediate process. The information on the intermediate process is effectively utilized for modification of the production plan according to the actual conditions. The arrangement of the third embodiment displays the three sets of information in parallel in the sequence of the production flow. This facilitates recognition of the whole situation.

C1. Modified Example: Modification of Information Sharing

Figure 13:
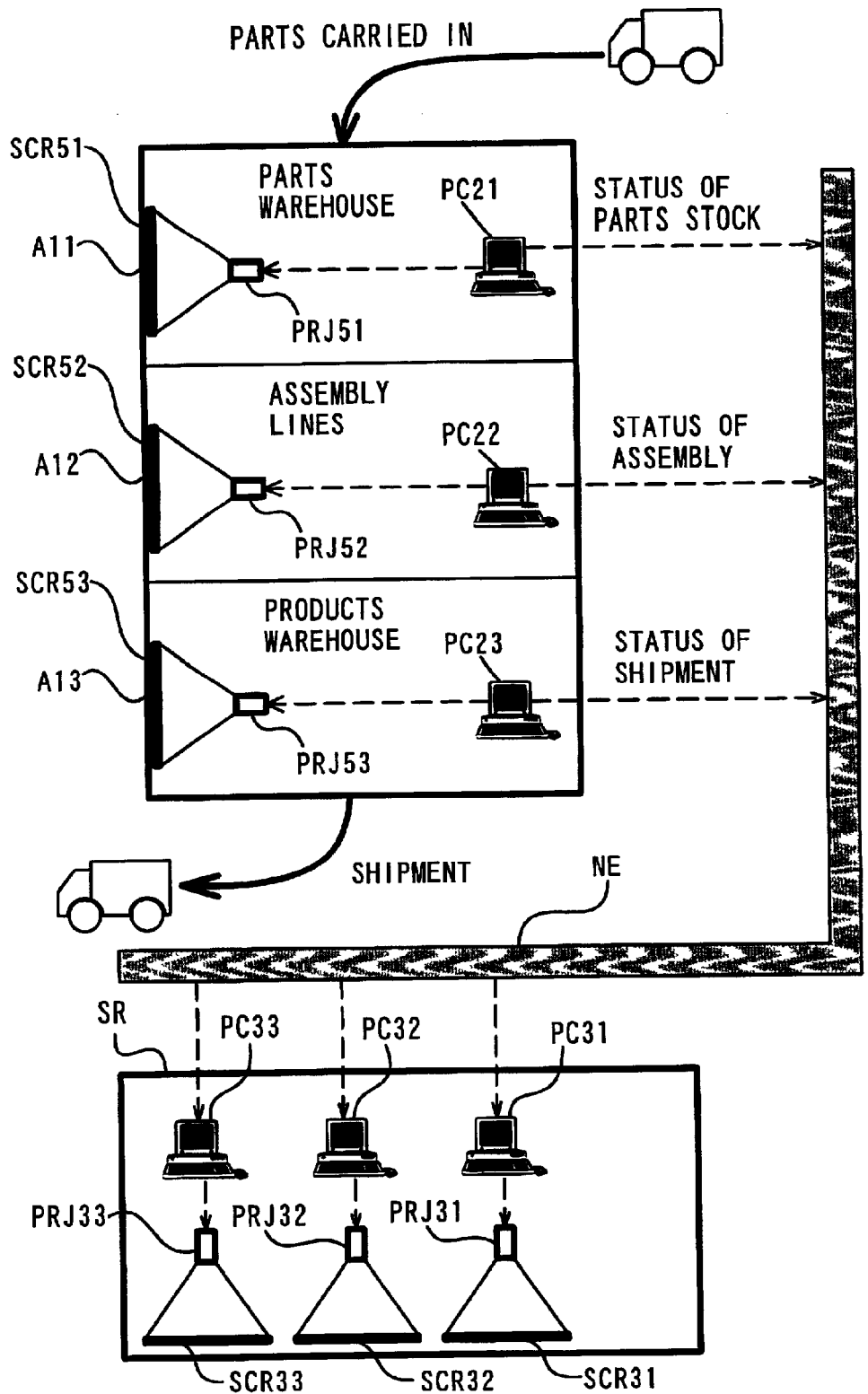
FIG. 13 schematically illustrates the modified configuration of the management system in a modified example of the third embodiment.

The third embodiment regards the display in the management section SR. The management information may also be displayed in the fields of production. FIG. 13 schematically illustrates the modified configuration of the management system in a modified example of the third embodiment. Liquid crystal projectors PRJ51, PRJ52, and PRJ53 and screens SCR51, SCR52, and SCR53 are located in the parts warehouse, the assembly lines, and the products warehouse, respectively. The liquid crystal projectors PRJ51, PRJ52, and PRJ53 cause the information regarding the status of parts stock, the status of assembly, and the status of shipment to be displayed in the respective areas in response to output signals from the computers PC21, PC22, and PC23. These pieces of information are also displayed in the management section SR as discussed in the third embodiment.

The displays in the respective areas of production may be identical with or different from the display in the management section SR (see FIGS. 10 to 12). It is preferable that the information is displayed in the forms suitable for the operations in the respective areas of production, whereas the information is displayed in the form suitable for production management in the management section SR. An example of the display is described in the case of the parts warehouse.

FIG. 14 shows the contents of the display in the parts warehouse. In the parts warehouse, the pieces of information useful for supply of parts from outside are displayed in two groups, that is, 'order of parts' and 'delivery status'. The display of the 'order of parts' includes the model name, the part number, the part name, the supplier, the date of requirement, the time of requirement, and the delivery schedule. The display of the 'delivery status' includes the model name, the part number, the part name, the supplier, the delivery schedule, the date of delivery, and the time of delivery. The 'date of delivery' and the 'time of delivery' specify the date and the time when the parts are actually delivered. The other items have the same meanings as discussed above with FIG. 10. The contents and the form of the display are not restricted to these settings but may be set arbitrarily according to the purpose of management.

The detailed display regarding the order and delivery status are useful in the parts warehouse for the smooth and accurate supply of parts from outside. In the management section, on the other hand, it is important to obtain the pieces of information that affect the total productivity, for example, information on the shortage of parts, without delay and omission. The display of excessive details may lead to oversight of important pieces of information. From this point of view, only the information regarding the shortage of parts (see FIG. 10) is displayed in the management section SR as the state of the parts warehouse. The information required for the detailed display as shown in FIG. 14 is input into the computer PC21 in the parts warehouse. In the management section SR, however, only the pieces of information regarding the shortage of parts are extracted for the display.

In a similar manner, the displays in the assembly lines and the products warehouse may be different from the display in the management section SR. For example, in the assembly lines, the status of assembly may be displayed with regard to each assembly line or each process in the assembly line. In the management section SR, on the other hand, the status of assembly with regard to all the assembly lines (see FIG. 11) is displayed. The detailed information on the shipment work (see FIG. 12) may be displayed in the products warehouse, whereas the display in the management section SR is simplified like three stages 'not shipped' 'during shipment' 'shipped'. It is, of course, not necessary to make the display in the fields of production different from the management section SR, but the same display may be used commonly. The shipment of products is the most important part in production management. It is thus highly effective to display the detailed information on the shipment status in the management section as well as in the field of production.

The management system of the modified example effectively uses the large-scaled displays for display of the information in the respective areas of production to attain the smooth and efficient progress of the operations, while sharing the required pieces of information in the management section SR. The transmission of information via the network and the display by means of the liquid crystal projector allow the input pieces of information to be processed to any form suitable for each area. This actualizes the effective information sharing.

In the modified example, the sets of information with regard to the three areas of production are displayed in the management section SR. The information with regard to only part of the areas of production may alternatively be displayed in the management section SR.

D. Fourth Embodiment: Information Supply to Upstream Process Areas

Figure 15:
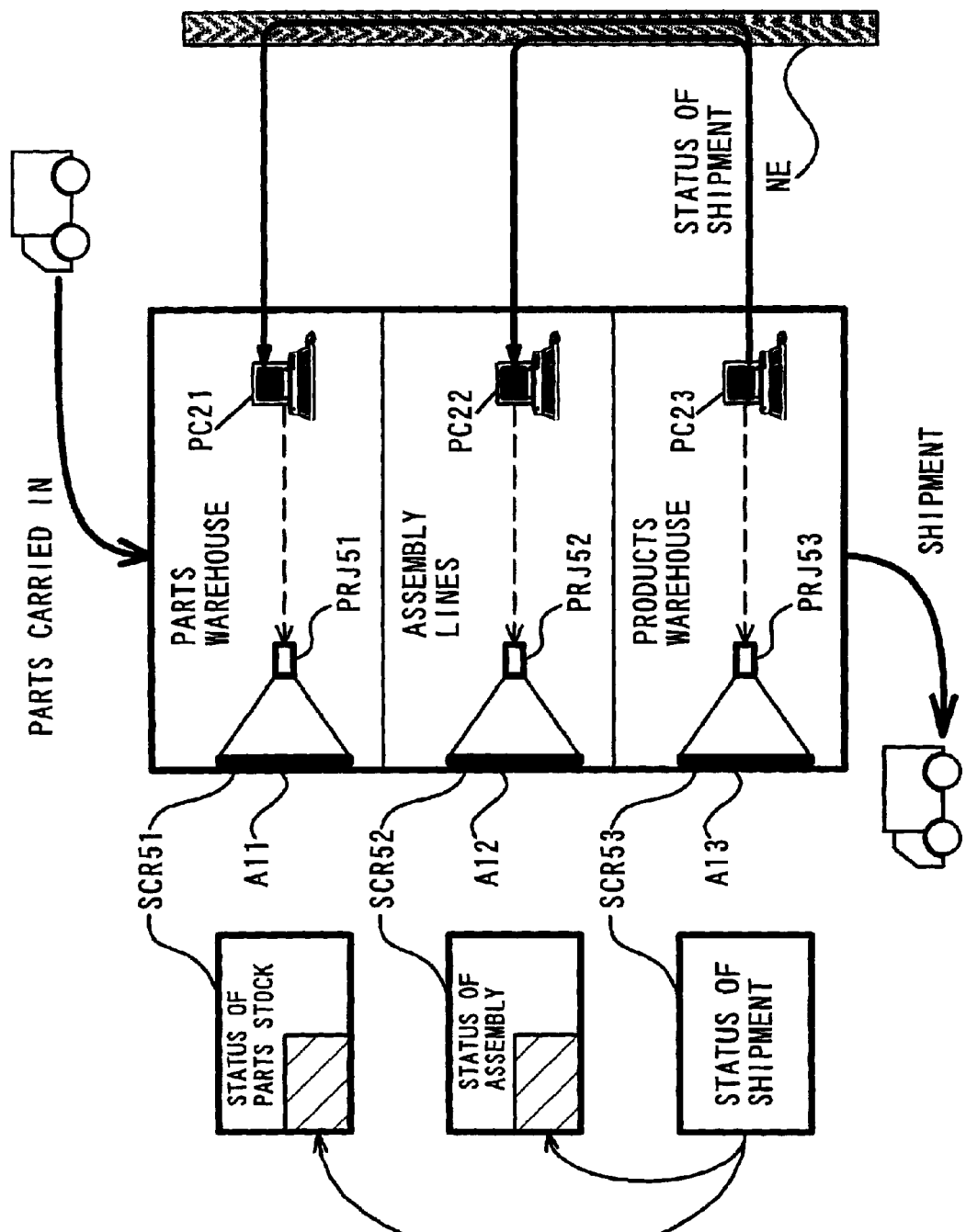
FIG. 15 illustrates the configuration of a management system in a fourth embodiment of the present invention.

FIG. 15 illustrates the configuration of a management system in a fourth embodiment of the present invention. As in the case of the third embodiment, the fourth embodiment regards an application to the production fields in the factory. In the third embodiment (see FIG. 9) and its modified example (see FIG. 13), the management section monitors the working conditions in the production fields. The fourth embodiment causes the information to be shared by the respective areas of production.

The management system of the fourth embodiment includes computers PC21, PC22, and PC23, liquid crystal projectors PRJ51, PRJ52, and PRJ53, and screens SCR51, SCR52, and SCR53 respectively located in the parts warehouse, the assembly lines, and the products warehouse. The computers PC21, PC22, and PC23 are connected to the network NE to allow mutual transmission of information. The connection may further establish transmission of information between the computers PC21, PC22, and PC23 and the management section or another area.

The working conditions in the respective areas are input into the computers PC21, PC22, and PC23. The input pieces of information are identical with those in the third embodiment and its modified example. In the arrangement of the fourth embodiment, The status of shipment in the products warehouse, which is the downstream-most process area, is transmitted to the parts warehouse and the assembly lines, which are the upstream process areas, via the network.

The respective pieces of input information are displayed on the screens SCR51, SCR52, and SCR53 by means of the liquid crystal projectors PRJ51, PRJ52, and PRJ53. The left part of FIG. 15 schematically shows the displays in the respective areas. The status of shipment is displayed on the screen SCR53 in the products warehouse. The contents of the display are identical with the status of shipment in the third embodiment (see FIG. 12).

In the assembly lines and the parts warehouse, the status of assembly and the status of parts stock are respectively displayed with the status of shipment superimposed on the screens SCR52 and SCR51. The hatched portions in FIG. 15 represent the display of the shipment status. In the arrangement of this embodiment, the contents of the display on the screen SCR53 are displayed in a contracted manner in the hatched portions. The displays of the third embodiment (see FIGS. 10 and 11) and the modified example (see FIG. 14) may be applied for the displays of the assembly status and the parts stock status in the fourth embodiment.

Like the third embodiment, the management system of the fourth embodiment effectively uses the large-scaled displays for display of the information in the respective areas of production to attain the smooth and efficient progress of the operations. The display of the shipment status in the respective upstream process areas enables the parts warehouse and the assembly lines to readily check the status of shipment and flexibly and independently perform the operations according to the status of shipment. When modification of the production plan is expected, for example, in the case where the shipment is behind schedule, the upstream process areas expect an instruction from the management section and prepare for the modification of the production plan. When an instruction is actually given to modify the production plan, the upstream process areas deal with the modification without much confusion. This enhances the flexibility of production in the factory.

There are a diversity of modified applications for the display of the fourth embodiment. One modified application provides separate liquid crystal projectors for displaying the shipment status in the assembly lines and the parts warehouse. Another modified application adopts the time-sharing arrangement to alternately display the information on the working status in its own area and the information on the shipment status. The information on the shipment status displayed in the assembly lines and the parts warehouse may be different from the information on the shipment status displayed in the products warehouse. For example, a portion of the information on the shipment state may be extracted and displayed in the assembly lines and the parts warehouse. The assembly status in the assembly lines may be displayed in the parts warehouse. The shipment status may be displayed in any upstream process area other than the assembly lines and the parts warehouse. The working state in an upstream process area may be displayed in a downstream process area, if information sharing gives some advantages. For example, the status of parts stock in the parts warehouse may be displayed in the assembly lines.

The above embodiments and their modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. For example, the embodiments regard the large display using the liquid crystal projector. The large display may, however, be actualized by any of electric display panels, displays, and other equivalent devices. Another available example is a digital display panel that does not utilize light for displaying information but mechanically drives a large number of display plates to change the contents of the display.

What is claimed is:

1. A management system that manages either of production in a factory and distribution in a warehouse, said management system comprising:

an input terminal that inputs an instruction and an actual condition with regard to at least one of storage and shipment of an article in a predetermined storehouse as occasion demands;

a memory device that stores information regarding the input instruction and actual condition therein; and a large-scaled display that displays the instruction and the actual condition stored in said storage device, thereby showing the instruction and the actual condition to a workforce in the predetermined storehouse without delay, wherein said large-scaled display is located at a specific position which allows each worker of the workforce to simultaneously recognize the display and the article on the worker's flow line in the predetermined storehouse.

2. A management system in accordance with claim 1, wherein the predetermined storehouse has a plurality of storage lanes of the article according to destinations of the shipment, and the instruction and the actual condition is displayed corresponding to each of the plurality of storage lanes.

3. A management system in accordance with claim 2, wherein the large-scaled display shows at least an instruction with regard to a type of the article to be stored and an instruction and an actual condition with regard to a numerical quantity of the each type of article to be stored.

4. A management system in accordance with claim 2, wherein the large-scaled display shows at least an instruction with regard to a destination of the article to be shipped, an instruction with regard to a numerical quantity of the article to be shipped, and an actual condition with regard to a numerical quantity of the article that has already been shipped.

5. A management system in accordance with claim 1, wherein the large-scaled display shows at least an instruction and an actual condition with regard to the storage, and the large-scaled display is located at a predetermined position to be recognized from at least either one of a preprocess area, where a predetermined required preprocess is performed prior to storage of the article in the predetermined storehouse, and an entrance to the predetermined storehouse.

6. A management system that manages production in a factory, wherein the factory includes a first section that manufactures products and a second section that supplies either of parts and materials used for the manufacture of the products, said management system comprising:

a first input terminal that inputs requirement for either of the parts and the materials in the first section as occasion demands;

a second input terminal that inputs delivery status with regard to the required parts or materials;

a memory device that stores the requirement and the delivery status therein; and a large-scale display that shows the requirement and the delivery status stored in said memory device in at least one of the first section and the second section, thereby showing the requirement and the delivery status to a workforce in at least one of the first section and the second section without delay, said large-scaled display is located at a specific position which allows each worker of the workforce to simultaneously recognize the display and the article on the worker's flow line.

7. A management system in accordance with claim 6, wherein at least one of the first section and the second section is a section having difficulty in direct observation, where one of the section has difficulty for direct observation of a working status of the other section of the first section and the second section due to the location of those sections, and said large-scaled display is located in the section having difficulty in direct observation.

8. A management system in accordance with claim 6, wherein the first section has a plurality of production lines for manufacturing products, and said large-scaled display displays the requirement and the delivery status corresponding to each of the plurality of production lines.

9. A management system that manages production in a factory, said management system comprising:

an upstream process input terminal that inputs an actual condition of a specific upstream process in a production flow in the factory as occasion demands;

a shipment input terminal that inputs a shipping status of products as occasion demands;

a memory device that stores the input actual condition of the specific upstream process and the input shipping status; and a large-scaled display that simultaneously shows the actual condition of the specific upstream process and the shipping status stored in said memory device in a management section that manages the production flow, thereby showing the actual condition to a workforce in the management section without delay, wherein said large-scaled display is located at a specific position which allows each worker of the workforce to simultaneously recognize the display and the article on the worker's flow line.

10. A management system in accordance with claim 9, wherein the specific upstream process is a supply process of either of materials and parts from outside.

11. A management system in accordance with claim 9, said management system further comprising another large-scaled display that shows the actual condition of the specific upstream process stored in said memory device and is located in a predetermined section corresponding to the specific upstream process, thereby showing the actual condition to substantially anyone in the predetermined section without delay.

12. A management system in accordance with claim 9, said management system further comprising another large-scaled display that displays the shipping status stored in said memory device and is located in a predetermined section corresponding to the shipment, thereby showing the shipping status to substantially anyone in the predetermined section without delay.

13. A management system in accordance with claim 9, wherein said memory device is a server that provides a client connecting with the Internet with the information stored therein via the Internet, in response to a requirement from the client.

14. A management system that manages production in a factory, wherein at least three areas including a product storage area where products are stored, an assembly area where the products are assembled, and a supply storage area where either of materials and parts to be supplied to the assembly area is stored, are arranged in the factory not to allow any one of the three areas to directly observe actual conditions of the others, and each of the three areas has an input terminal that inputs a working status of the area and a large-scaled display that displays the working status in response to the input, said management system further comprising:

a network that transmits information regarding the working status of one of the three areas to another specific area that is present in the factory; and a large-scaled display that displays the transmitted information in the specific area to a workforce, said large-scaled display is located at a specific position which allows each worker of the workforce to simultaneously recognize the display and the article on the worker's flow line.

15. A management system in accordance with claim 14, wherein the specific area is a management section that manages a production flow in the factory.

16. A management system in accordance with claim 14, wherein the information transmitted via the network regards a working status of at least one of residual two areas other than the supply storage area, and the specific area is an upstream process area corresponding to an upstream process, which is prior to a process performed in the area where the transmitted information is input.

17. A management system in accordance with claim 14, wherein information regarding a working status of one of the three areas is transmitted to at least one of residual two areas via the network, and said large-scaled display located in the area that receives the transmitted information shows the transmitted information simultaneously with the information of the area.

18. A management system in accordance with claim 1, wherein the large-scaled display is a projector-type liquid crystal display.

19. A method of managing either of production in a factory and distribution in a warehouse, said managing method comprising the steps of:

causing a storage-relating instruction and an actual condition of storage to be displayed on a large-scaled display that is located at a specific position on a worker's flow line in a predetermined storehouse of an article, which allows the display and the article to be recognized simultaneously; and updating the display without delay in response to input of the storage-relating instruction and the actual condition of storage from an input terminal;

wherein said large-scaled display is located at a specific position which allows each worker of the workforce to simultaneously recognize the display and the article on the worker's flow line in the predetermined storehouse.

20. A method of managing production in a factory, said managing method comprising the steps of:

causing requirement regarding requirement for either of parts and materials used for manufacture of products and delivery status to be displayed on a large-scaled display; and updating the display without delay in response to input of the requirement from an input terminal located in a production section and input of the delivery status from an input terminal located in a supply section that is in charge of supplying either of the parts and the materials;

wherein said large-scaled display is located at a specific position which allows each worker of the workforce to simultaneously recognize the display and the article on the worker's flow line.

21. A method of managing production in a factory, said managing method comprising the steps of:

causing an actual condition of a specific upstream process in a production flow and a shipping status of products to be displayed on a large-scaled display that is located in a management section that manages the production flow in the factory; and updating the display without delay in response to input of the actual condition of the specific upstream process from an input terminal located in a section corresponding to the specific upstream process and input of the shipping status from an input terminal located in a storehouse of the products;

wherein said large-scaled display is located at a specific position which allows each worker of the workforce to simultaneously recognize the display and the article on the worker's flow line.

22. A method of managing production in a factory, wherein at least three areas including a product storage area where products are stored, an assembly area where the products are assembled, and a supply storage area where either of materials and parts to be supplied to the assembly area is stored, are arranged in the factory not to allow any one of the three areas to directly observe actual conditions of the others, said managing method comprising the steps of:

(a) causing a working status of each of the three areas to be displayed on a large-scaled display located in the area, while updating the display as occasion demands; and (b) causing the working status of at least one of the three areas to be displayed on a large-scaled display located in another area that is present in the factory, while updating the display as occasion demands;

wherein said large-scaled display is located at a specific position which allows each worker of the workforce to simultaneously recognize the display and the article on the worker's flow line.

* * * * *